(12) United States Patent
Khayrallah

(10) Patent No.: US 8,514,924 B2
(45) Date of Patent: Aug. 20, 2013

(54) JOINT DEMODULATION AND INTERFERENCE SUPPRESSION USING SERIAL LOCALIZATION WITH INDECISION

(71) Applicant: Telefonaktiebolaget L M Ericsson (Publ), Stockholm (SE)

(72) Inventor: Ali S. Khayrallah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/714,925

(22) Filed: Dec. 14, 2012

(65) Prior Publication Data
US 2013/0107994 A1    May 2, 2013

Related U.S. Application Data

(63) Continuation of application No. 12/549,157, filed on Aug. 27, 2009, now Pat. No. 8,355,471.

(51) Int. Cl.
*H04L 27/01* (2006.01)

(52) U.S. Cl.
USPC .......................... 375/232; 375/340

(58) Field of Classification Search
USPC ................. 375/232, 229, 230, 350, 262, 340, 375/341, 320
See application file for complete search history.

(56) References Cited

U.S. PATENT DOCUMENTS

| | | | |
|---|---|---|---|
| 2001/0017898 A1* | 8/2001 | Raheli et al. | 375/262 |
| 2004/0083082 A1* | 4/2004 | Onggosanusi et al. | 703/2 |
| 2004/0240591 A1* | 12/2004 | Sexton et al. | 375/341 |
| 2005/0152485 A1* | 7/2005 | Pukkila et al. | 375/348 |
| 2005/0243943 A1* | 11/2005 | Stirling-Gallacher | 375/267 |
| 2005/0271170 A1* | 12/2005 | Khayrallah | 375/346 |
| 2010/0080279 A1* | 4/2010 | Saints et al. | 375/232 |

* cited by examiner

*Primary Examiner* — Aristocratis Fotakis

(57) ABSTRACT

A receiver includes a constellation processing module and a multi-stage demodulator having a plurality of non-final demodulation stages and a final demodulation stage. The constellation processing module derives a set of centroid-based values from subsets of constellation points associated with a plurality of transmitted signals for input to each of the non-final demodulation stages. Each of the non-final demodulation stages demodulates a group of signals input to the non-final demodulation stage using the set of centroid-based values as constellation points and suppresses residual interference associated with using the set of centroid-based values as constellation points for signal demodulation. The final demodulation stage demodulates a group of modified signals input to the final demodulation stage using the subset of constellation points input to the final demodulation stage to determine a final symbol decision for the plurality of transmitted signals.

15 Claims, 9 Drawing Sheets

JOINT DEMODULATION AND INTERFERENCE SUPPRESSION USING SERIAL LOCALIZATION WITH INDECISION

CROSS-REFERENCE TO RELATED APPLICATION

This application is a continuation of patent application Ser. No. 12/549,157, filed on Aug. 27, 2009, which is incorporated by reference herein in its entirety.

TECHNICAL FIELD

The present invention generally relates to joint demodulation and interference suppression, and more particularly relates to joint demodulation and interference suppression based on serial localization with indecision.

BACKGROUND

Multi-stage arbitration (MSA) involves sifting through a large set of candidates in multiple stages, where each stage rejects some candidates, until a single candidate is left after the final stage. MSA-based receivers have been used in MIMO (Multiple-Input, Multiple-Output) environments where information is transmitted and received using a plurality of antennas. In a multi-stream scenario such as MIMO or multi-code transmission, MSA increases the number of streams processed jointly in consecutive stages. That is, in the first stage, each stream may be processed individually by a single detector (SD), pairs of streams may be processed together by a joint detector (JD) in the second stage, and so on. Doing so ensures complexity remains manageable, while mimicking the behavior of a true JD over all streams, which is MLD (Maximum-Likelihood Detection) in this scenario.

Consider an N×N MIMO scenario over a non-dispersive channel, given by:

$$r = Hs + n \quad (1)$$

Here r, s and n are N×1 vectors, and H is a N×N matrix. The components of H are independent and Rayleigh faded, and by default, n is white Gaussian noise with covariance $R_n = \sigma^2 I$. More generally, n may have any covariance, which can be estimated by conventional methods. All N signals are from the same constellation Q of size q, and all N signals are transmitted with the same power. The effective constellation for s is of size $q^N$. The full JD is the MLD for s, which searches over all $q^N$ candidate $\hat{s}$ for one that minimizes the squared distance given by:

$$(r - H\hat{s})^H (r - H\hat{s}) \quad (2)$$

The JD can be modified by letting the set A contain the $N_A$ out of N streams being processed jointly, and the set B contain the remaining $N_B = N - N_A$ streams acting as interference. The signals in set B are modeled as colored noise, and suppressed by a whitening pre-filter. This type of receiver is referred to herein as a whitening JD (WJD).

Without loss of generality, it can be assumed that A occupies the top of s, and B occupies the bottom of s. Other cases follow similarly. The transmitted signals s, channel H and received signals r can then be respectively expressed as:

$$s = \begin{bmatrix} s_A \\ s_B \end{bmatrix} \quad (3)$$

$$H = [H_A, H_B] \quad (4)$$

and $$r = H_A s_A + H_B s_B + n = H_A s_A + u \quad (5)$$

where $H_A$ is a $N \times N_A$ matrix, $H_B$ is a $N \times N_B$ matrix, $s_A$ is a $N_A \times 1$ vector, $s_B$ is a $N_B \times 1$ vector and u is a N×1 vector.

Vector u can be modeled as a colored noise and the transmitted symbols are presumed to have zero mean. This is the case for most well known constellations. Under these conditions, $s_B$ has zero mean, and consequently so does $H_B s_B$. In addition, $H_B s_B$ has covariance given by:

$$R_B = H_B H_B^H E_B \quad (6)$$

where $E_B$ is the average symbol energy in $s_B$. Thus u has zero mean and covariance as given by:

$$R_u = R_B + R_n \quad (7)$$

With the colored noise model, the JD for A searches over all $q^{N_A}$ candidates $\hat{s}_A$ for one that minimizes the following metric:

$$(r - H_A \hat{s}_A)^H R_u^{-1} (r - H_A \hat{s}_A) = r^H R_u^{-1} r - 2 Re\{\hat{s}_A^H H_A^H R_u^{-1} r\} + \hat{s}_A^H H_A^H R_u^{-1} H_A \hat{s}_A \quad (8)$$

Equation (8) can be manipulated to identify a pre-filter, whose output feeds a detector. The $N \times N_A$ matrix given by:

$$W = R_u^{-1} H_A \quad (9)$$

is the pre-filter. The output of the pre-filter is the $N_A \times 1$ vector given by:

$$z_A = W^H r \quad (10)$$

The first term from equation (8) can be dropped since it does not depend on $\hat{s}_A$. The remaining two terms from equation (8) are identified as:

$$m(\hat{s}_A) = -2 Re\{\hat{s}_A^H z_A\} + \hat{s}_A^H H_A^H R_u^{-1} H_A \hat{s}_A \quad (11)$$

which will be used as the metric of the JD with input $z_A$. Thus the WJD consists of a pre-filter given by equation (9), and a JD with a metric given by equation (11).

This detector is optimal when u is a jointly Gaussian noise vector with zero mean and covariance $R_u$. The pre-filter collects the energy of the desired signal in A while suppressing the other signals in B as interference. The whitening SD (WSD) is a special case of the WJD with $N_A = 1$. The pre-filter for SD whitens the interference from the remaining $N_B = N - 1$ streams. The pre-filter vector W is a N×1 vector, and the output $z_A$ is a scalar. The detector compares q candidates $\hat{s}_1$ for signal $s_1$. The problem with JD is the corresponding exploding complexity, whether due to the size of the modulation itself, or to the exponential effect of multiple streams. The whitening JD helps to reduce the complexity by limiting the number of signals processed jointly. However, further complexity reduction is often desirable.

SUMMARY

Joint demodulation and interference suppression is performed in a series of stages. Each stage includes a serial localization with indecision (SLI) block adapted for use in a MSA receiver for MIMO or multi-coded signal transmission scenarios. Each SLI block functions as a multi-stage detector. The SLI blocks combine JD for a number of MIMO streams or SD for a single stream, and perform interference suppression for the remaining streams. Interference suppression can be achieved by a pre-filter that models sources of interference as colored noise. The sources include a self-interference residual signal due to the use of sets of centroid-based values for demodulation instead of actual constellation points. Adjacent sets of centroid-based values have overlapping points, which introduces indecision. The indecision feature of SLI is beneficial in a multi-stage structure such as MSA, because the indecision discourages an irreversible bad decision in an early stage.

According to an embodiment of a method for jointly demodulating and suppressing interference from a plurality of transmitted signals transmitted using a multi-antenna and/or multi-code transmission scheme, the method includes deriving a set of centroid-based values from subsets of constellation points associated with the transmitted signals for input to each non-final stage of a multi-stage demodulator. A group of signals input to each of the non-final stages is demodulated using the corresponding set of centroid-based values as constellation points. Residual interference associated with using the set of centroid-based values as constellation points for demodulating the group of signals input to each of the non-final stages is suppressed. A group of modified signals input to a final stage of the multi-stage demodulator is demodulated using the subset of constellation points input to the final stage to determine a final symbol decision for the plurality of transmitted signals.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
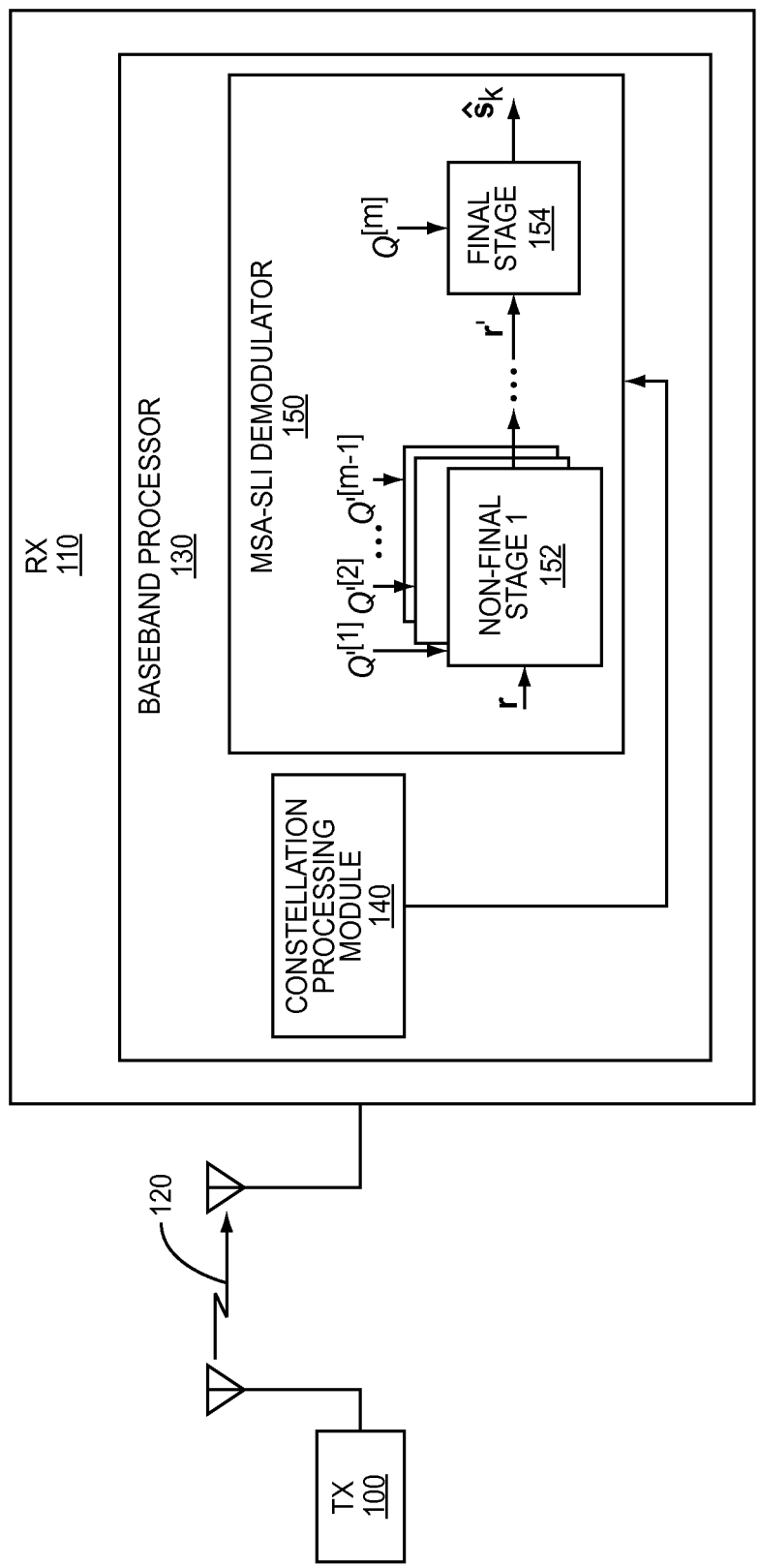
FIG. 1 illustrates a block diagram of an embodiment of a receiver including an MSA-SLI demodulator and a constellation processing module.

FIG. 1 illustrates an embodiment of a wireless transmitter 100 in communication with a wireless receiver 110 over a channel 120. The receiver includes a baseband processor 130 and a constellation processing module 140 and a MSA-SLI demodulator 150 included in or associated with the baseband processor 130. The constellation processing module 140 groups points of a constellation associated with a plurality of transmitted signal into different subsets, e.g., subsets of ASK (Amplitude-Shift Keying) constellation points, QAM (Quadrature Amplitude Modulation) constellation points, etc. At least two adjacent subsets have one or more common constellation points to ensure that these adjacent subsets overlap. In some embodiments, all adjacent subsets have one or more common constellation points to ensure that all adjacent subsets overlap. In each case, the constellation processing module 140 also determines a centroid-based value for each of the subsets of constellation points and groups the centroid-based values into one or more sets. The values included in each set are centroid-based in that they may be actual centroids, approximations of centroids such as integer values or values quantized to a certain finite precision, the closest constellation point to a centroid, etc. More generally, each subset is assigned a representative, which we call a centroid from here on.

The MSA SLI demodulator 150 includes different non-final demodulation stages 152 for sifting through a large set of candidates in multiple stages, where each non-final stage rejects some candidates, until a single candidate is left after the final stage 154. The MSA-SLI demodulator 150 is well adapted for MIMO and multi-coded transmission environments. In a multi-stream scenario such as MIMO or multi-code transmission, the MSA-SLI demodulator 150 increases the number of streams processed jointly in consecutive stages. For example, in a first one of the non-final stages 152, individual single detectors process the entire received signal vector r, each detecting a single stream. In the second stage, joint detectors (JD) process the entire received vector r, or a modified version of r, each detecting a pair of streams, and so on. Unlike conventional MSA structures, the non-final stages 152 of the MSA-SLI demodulator 150 do not use the true signal constellation to perform demodulation and interference suppression. Instead, the non-final demodulation stages 152 use sets of centroid-based values derived from the actual signal constellation to process the signal input to the respective stages. Only the last stage 154 of the MSA-SLI demodulator 150 uses a subset of the true signal constellation for signal processing.

In more detail, the MSA-SLI demodulator 150 has m total stages where $m \geq 2$. The demodulators included in the first stage of the non-final demodulation stages 152 demodulate the entire received signal vector r input to the stage using the set of centroid-based values $Q'^{[1]}$ input to or selected by the first stage as constellation points. Each of the demodulators include in the first non-final demodulation stage 152 also suppress the residual interference associated with using the set of centroid-based values as constellation points for signal demodulation instead of the true constellation. Each of the remaining non-final stages 152 demodulate a modified signal vector output by the immediately preceding stage using the set of centroid-based values $Q'^{[2]}, \ldots, Q'^{[m-1]}$ input to or selected by the stage as constellation points. The final demodulation stage 154 demodulates modified signal vector r' input to the final demodulation stage using the subset of constellation points associated with the transmitted signals to determine a final symbol decision $\hat{s}_k$ for the transmitted signals. The constellation processing module 140 ensures that at least two adjacent subsets of constellation points overlap to reduce the likelihood of demodulation errors, particularly for the earlier non-final demodulation stages 152 as will be described in more detail later herein.

Figure 2:
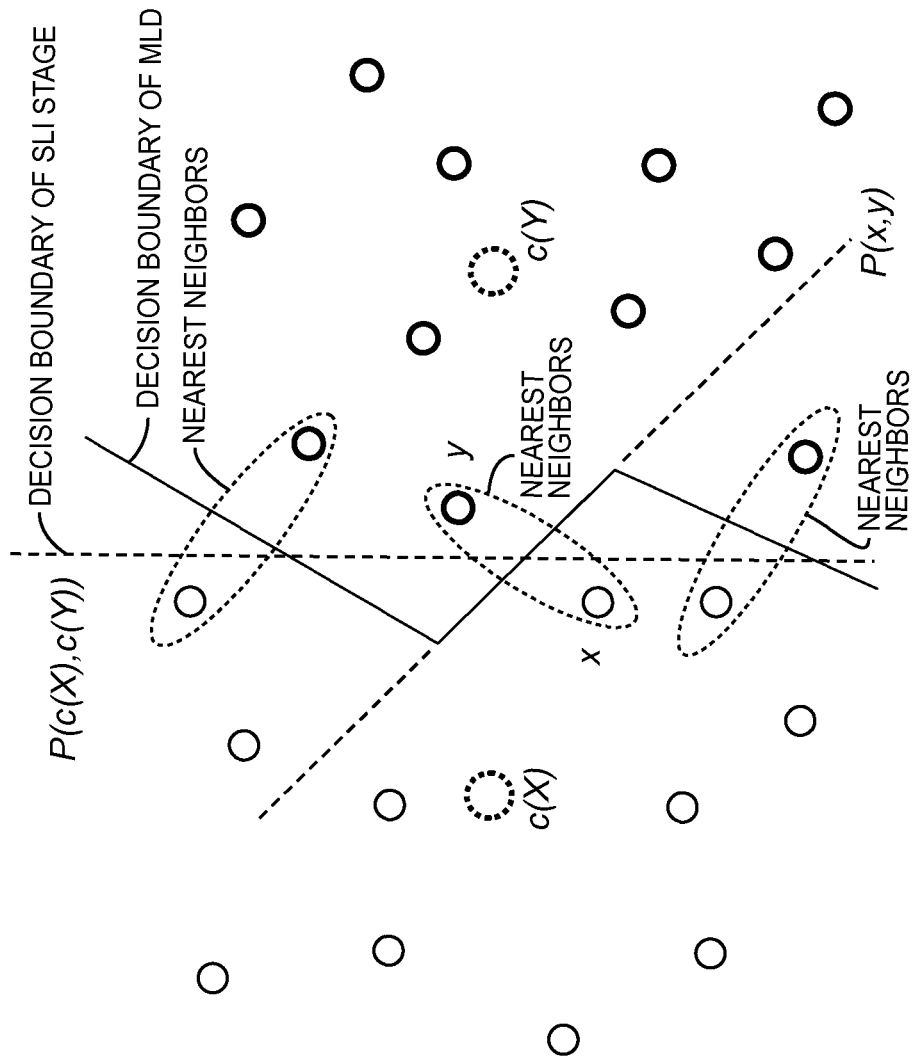
FIG. 2 illustrates a diagram of an embodiment of overlapping constellation subsets for use by an MSA-SLI demodulator.

FIG. 2 illustrates the effective decision boundary between adjacent subsets X and Y in two dimensions, where the hyperplane becomes a straight line and each constellation point is represented by a circle. In contrast, the decision boundary for a Maximum Likelihood (ML) detector such as JD is a piecewise straight jagged line. The discrepancy between these hypothetical decision boundaries leads to a performance loss in MSA-SLI.

Overlapping adjacent subsets smoothes the decision boundary discrepancy. In particular, in the two stage MSA-SLI, including nearest neighbor symbols pairs in the overlap of adjacent subsets of the first stage means that the first stage does not have to make a decision about those symbols. That decision will be made in the second stage.

With MSA-SLI, the search is further localized from one stage to the next, but the final decision is not made until the last stage. In particular, by making nearest neighbor symbols belong to multiple subsets, a later demodulation stage may recover from an error in an earlier stage. In this context, indecision is beneficial. However, ensuring adjacent subsets overlap has a cost. In terms of complexity, q' or q", or both, will increase for the overlap case in comparison to the disjoint case.

Figure 3:
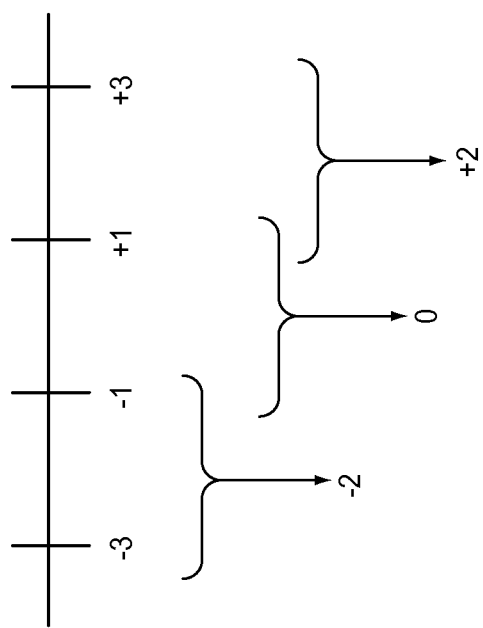
FIG. 3 illustrates a diagram of an embodiment of overlapping ASK constellation subsets for use by an MSA-SLI demodulator.

FIG. 3 illustrates an exemplary embodiment of an 4-ASK constellation grouped into three subsets. The 4-ASK constellation is given by:

$$Q=\{-3,-1,+1,+3\} \quad (12)$$

The three overlapping subsets shown in FIG. 3 have centroids given by:

$$Q'=\{-2,0,+2\} \quad (13)$$

The two outer subsets shown in FIG. 3 are offsets of one another, and the offset is equal to the centroid difference. MSA-SLI complexity can be further reduced by accounting for the highly structured nature of these subsets. Of course, less structured subsets can also be used with the MSA-SLI receiver structures described herein.

Figure 4:
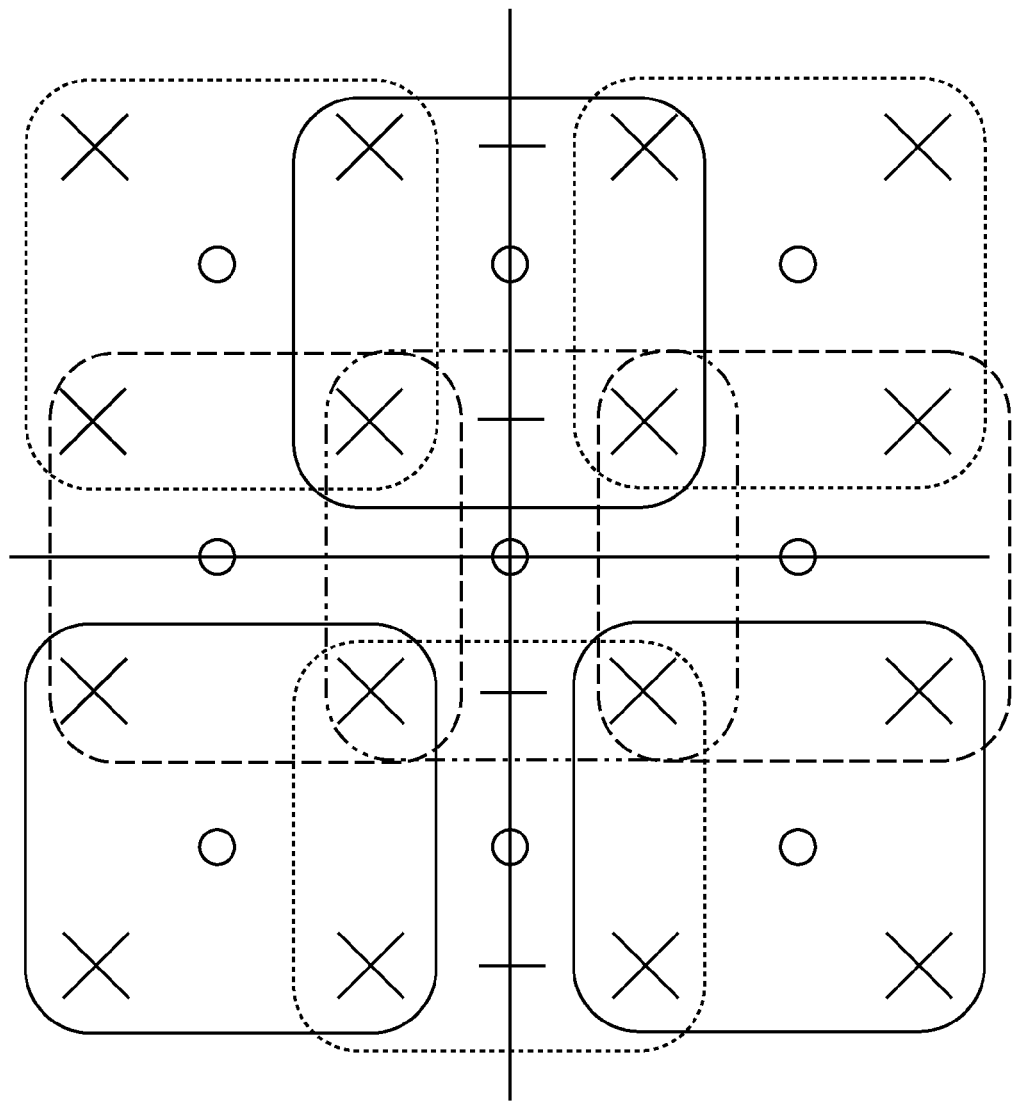
FIG. 4 illustrates a diagram of an embodiment of overlapping QAM constellation subsets for use by an MSA-SLI demodulator.

FIG. 4 illustrates an embodiment where the ASK subset design shown in FIG. 3 is extended to 16-QAM. Each QAM constellation point shown in FIG. 4 is represented by an 'X' and the centroids by an 'o'. The three ASK subsets shown in FIG. 3 yield nine subsets for 16-QAM as illustrated by the boxes drawn around the different groups of constellation points in FIG. 4. At least two adjacent subsets have overlapping constellation points. This design is referred to herein as SL32, in reference to the ASK subsets. Let $Q^{[1]}$ denote the set of 16-QAM centroids and $Q^{[2]}$ denote the centered subset with 4 elements, corresponding to QPSK. The SL32 design can be used in a 2-stage MSA SLI receiver, where the first stage uses $Q^{[1]}$ of size $q^{[1]}=9$, and the second stage uses $Q^{[2]}$ size $q^{[2]}=4$.

The same concept applies to 64-QAM. With two stages, the MSA-SLI design is referred to herein as SL34, with $q^{[1]}=9$, and $q^{[2]}=16$, corresponding to 16-QAM. Dividing the 16-QAM subset again as before, we get a MSA SLI design referred to herein as SL332 which is suited for three stages, with $q^{[1]}=9$, $q^{[2]}=9$, and $q^{[3]}=4$. The SL332 design is well suited for use with 4×4 MIMO as will be described in more detail later herein. The design of overlapping subsets need not be based on the component ASK constellation.

Figure 5:
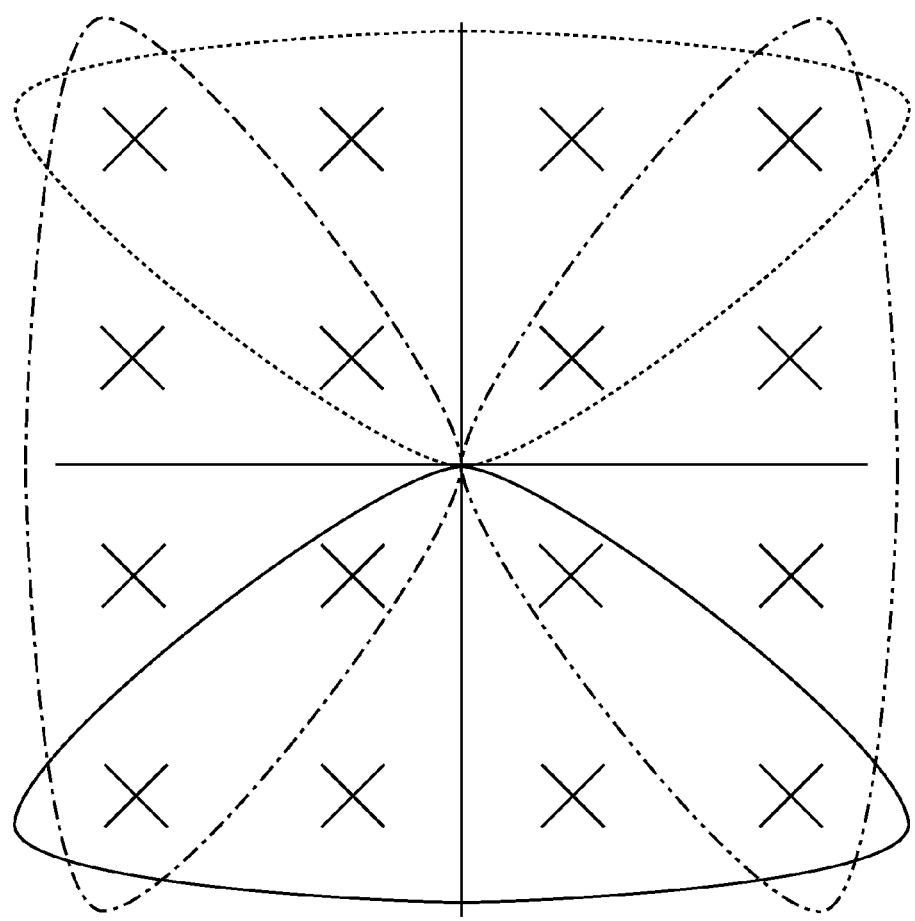
FIG. 5 illustrates a diagram of another embodiment of overlapping QAM constellation subsets for use by an MSA-SLI demodulator.

FIG. 5 illustrates an embodiment of the 16-QAM constellation where each of the subsets is directly determined from the QAM constellation associated with the transmitted signals and not derived from ASK. Each QAM constellation point shown in FIG. 5 is represented by an 'X' and the subsets are shown as boxes drawn around different groups of constellation points. Again, two or more adjacent subsets have overlapping constellation points. Each of the MSA-SLI demodulation embodiments described herein, including subset selection, yield a low complexity alternative to MLD with good performance. MSA-SLI demodulation provides a distinct complexity advantage as the effective modulation constellation grows, such as in MIMO and multi-code scenarios.

Figure 6:
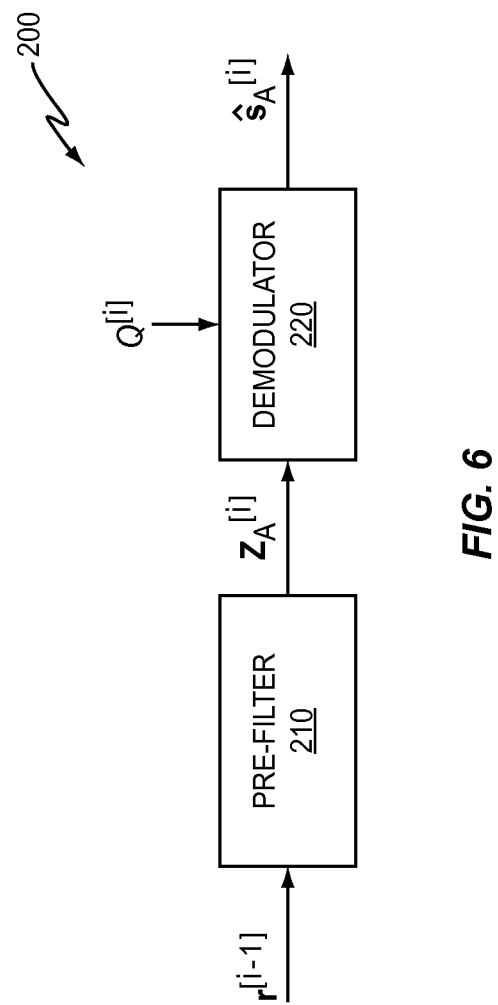
FIG. 6 illustrates a block diagram of an embodiment of an i-th stage of an MSA-SLI demodulator.

FIG. 6 illustrates an embodiment of a whitening SLI block 200 for use as a demodulator in the i-th non-final stage 152 of the MSA-SLI demodulator 150. The whitening SLI block 200 demodulates the signals included in set A (denoted as signal $s_A$) and suppresses the remainder of the signals included in set B (denoted as signal $s_B$). The whitening SLI block 200 includes a pre-filter 210 and a JD 220. The pre-filter 210 filters the signal vector $r^{[i-1]}$ output by the immediately preceding stage of the MSA-SLI demodulator 150 to suppress signal set B. The pre-filter output $N_A \times 1$ is a vector denoted by $z_A^{[i]}$. The JD 220 uses centroid-based constellation $Q^{[i]}$ provided by the constellation processing module 140 to perform demodulation and interference suppression on the pre-filter output instead of using the true constellation Q, and the search is over $(q^{[i]})^{N_A}$ candidates $\hat{s}_A^{[i]}$. In more detail, the JD 220 operates over $N_A$ signals in A to produce $\hat{s}_A^{[i]}$. The metric $m(\hat{s}_A)$ in equation (11) is suited for the whitening SLI block 220, in the sense that $m(\hat{s}_A)$ puts no particular restriction on $\hat{s}_A$. As such, $\hat{s}_A$ can be replaced with $\hat{s}_A^{[i]}$, and $m(\hat{s}_A^{[i]})$ can be computed based on $\hat{s}_A^{[i]}$ as given by equation (11) with this substitution. As a result, the whitening SLI block 220 for the i-th non-final stage 152 of the MSA SLI demodulator 150 produces a localization of signal $s_A$. The use of $Q^{[i]}$ instead of Q causes an intentional residual signal which acts as self-interference. Equation (5) can be expanded to highlight the residual signal for the two-stage case as follows:

$$r = H_A s_A^{[1]} + H_A s_A^{[2]} + H_B s_B + n = H_A s_A^{[1]} + v \quad (14)$$

The residual signal $H_A s_A^{[2]}$ can be accounted for by modeling it as a second colored noise, with zero mean, and covariance as given by:

$$R_A^{res} = H_A H_A^H E_A^{res} \quad (15)$$

where $E_A^{res}$ is the energy in the residual signal, corresponding to subset $Q^{[2]}$ for the two-stage case. The total covariance then becomes:

$$R_v = R_B + R_A^{res} + R_n \quad (16)$$

The rest of the operations are similar to that of a conventional whitening JD, except that $R_u$ of equation (7) is replaced with $R_v$ of equation (16).

In general, at any stage of the MSA-SLI demodulator 150, the residual interference is properly accounted for. The exception is the last stage 154, where there is no residual interference left. In particular, with the SL32 subset design for 16-QAM, $E_A^{res}$ in the first non-final stage 152 corresponds to $Q^{[2]}$, which coincides with the QPSK constellation. For the SL34 design and 64-QAM, $E_A^{res}$ in the first non-final stage 152 corresponds to $Q^{[2]}$, which coincides with the 16-QAM constellation. For the 3-stage MSA-SLI with the SL332 design and 64-QAM, $E_A^{res}$ in the first non-final stage 152 corresponds to the 16QAM subset, which is different from $Q^{[2]}$. In the second stage 154, $E_A^{res}$ corresponds to $Q^{[3]}$, which coincides with the QPSK subset. In the third and last stage, there is no residual interference, and $E_A^{res}$ is zero.

Figure 7:
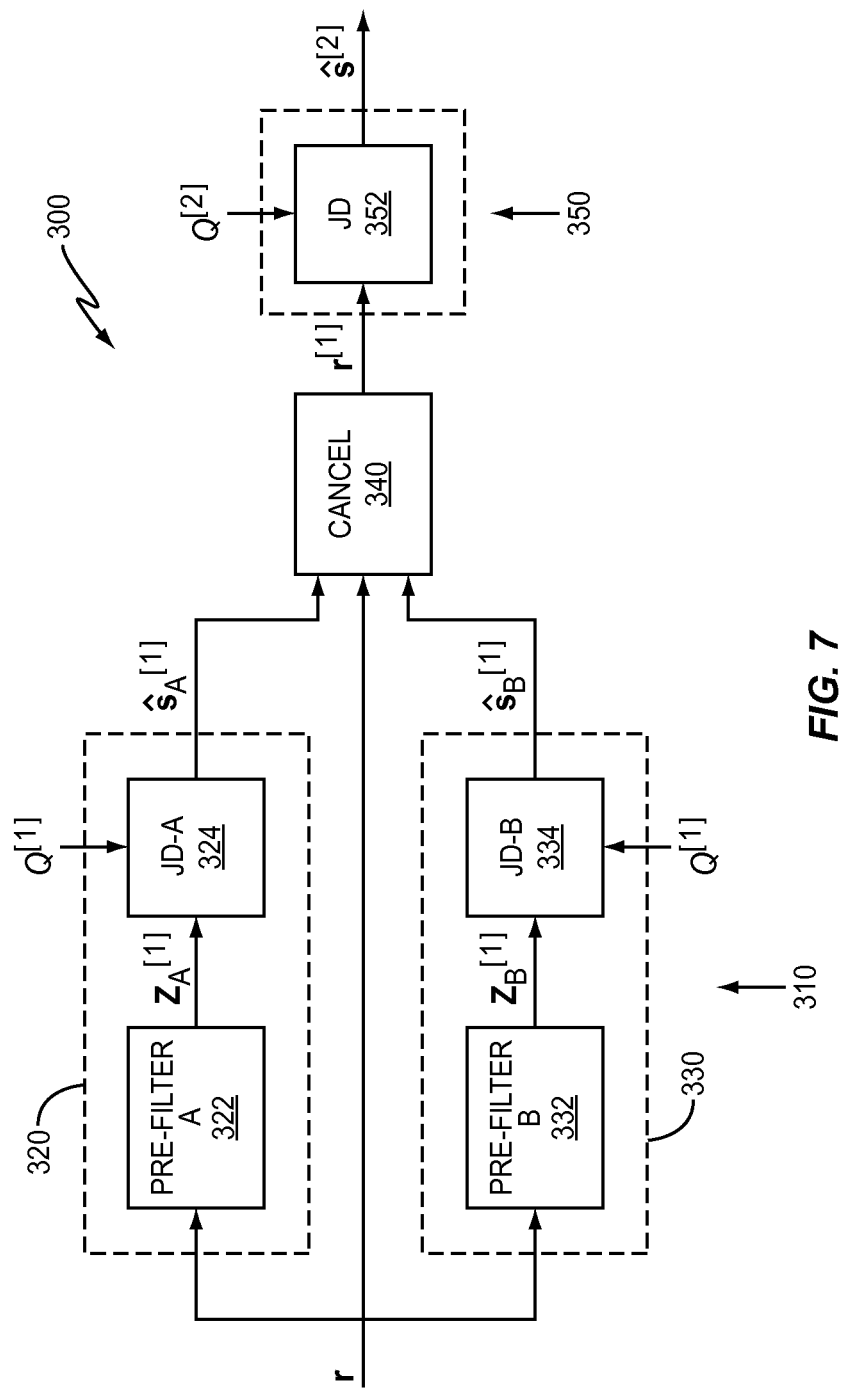
FIG. 7 illustrates a block diagram of an embodiment of 2-stage MSA-SLI receiver structure.

FIG. 7 illustrates an embodiment of a 2-stage MSA-SLI receiver structure 300. The first stage 310 includes two demodulators 320, 330, each demodulator including a pre-filter 322, 332 and a JD 324, 334, respectively. The pre-filter 322 of the first demodulator 320 suppresses signal B for the benefit of signal A. The pre-filter 332 of the second demodulator 330 similarly suppresses signal A for the benefit of signal B. The JD 324 of the first demodulator 320 accepts the pre-filter output $z_A^{[1]}$ and functions as a whitening JD over the centroid-based constellation $Q^{[1]}$, determining localized symbol $\hat{s}_A^{[1]}$ in accordance with equations (6)-(11). The JD 334 of the second demodulator 330 similarly accepts the pre-filter output $z_B^{[1]}$ and also functions as a whitening JD over the centroid-based constellation $Q^{[1]}$, determining localized symbol decision $\hat{s}_B^{[1]}$. For the second demodulator 330 of the first stage 310, the roles of sets A and B are reversed. In particular, $H_A$ and $H_B$ are switched in equations (6)-(11). The reconstructed signal based on $\hat{s}_A^{[1]}$ and $\hat{s}_B^{[1]}$ is subtracted from r by a signal canceller 340 to produce $r^{[1]}$. The second stage 350 of the 2-stage MSA-SLI receiver structure 300 also includes a demodulator 352 which accepts modified signal vector $r^{[1]}$ and functions as a JD over constellation $Q^{[2]}$.

Operation of the 2-stage MSA-SLI receiver structure 300 is described next in more detail. For notational compactness, a block that operates jointly over K streams is referred to as JD-K. The reconstructed signal based on $\hat{s}_A^{[1]}$ and $\hat{s}_B^{[1]}$ is subtracted from the original received signal vector r to produce modified signal vector $r^{[1]}$ as given by:

$$r^{[1]} = r - H \begin{bmatrix} \hat{s}_A^{[1]} \\ \hat{s}_B^{[1]} \end{bmatrix} \quad (17)$$
$$= r - H_A \hat{s}_A^{[1]} - H_B \hat{s}_B^{[1]}$$
$$= r - \hat{r}_A^{[1]} - \hat{r}_B^{[1]}$$

This can be interpreted as a cancellation of the effects of the partial solutions $\hat{s}_A^{[1]}$ and $\hat{s}_B^{[1]}$. The localized symbol decision determined by the demodulator 352 included in the second stage 350 of the 2-stage MSA-SLI receiver structure 300 is denoted $\hat{s}^{[2]}$. Finally, $\hat{s}_A^{[1]}$, $\hat{s}_B^{[1]}$ and $\hat{s}^{[2]}$ are combined to produce the overall solution as given by:

$$\hat{s} = \begin{bmatrix} \hat{s}_A^{[1]} \\ \hat{s}_B^{[1]} \end{bmatrix} + \hat{s}^{[2]} \quad (18)$$

One skilled in the art will readily recognize that going from two stages to a more general multi-stage structure is straightforward.

For example, consider a second stage SLI block with signal vector input $r^{[1]}$ and which processes $N_A < N$ streams. From equation (17), all of the reconstructed signals have been subtracted from $r^{[1]}$. Thus, the effective symbol energy of the interfering signals in set B is adjusted from $E_B$ to a smaller quantity $E_B^{res}$, which can be computed from the residual constellation, e.g. as was done for $E_A^{res}$ as previously described herein. This adjustment is made for any SLI block in the second or later stage with $N_A < N$. If $N_A = N$, then the set B is empty, and there is no whitening that must be done.

The MSA-SLI receiver structures disclosed herein readily apply to MIMO with QAM. For example, the MSA-SLI receiver structures disclosed herein can be applied to 2×2 MIMO with 16-QAM. In one embodiment, the MSA-SLI architecture employs the SL32 design where A={1} and B={2}. Referring to FIG. 7, in the first stage 310, the two SLI blocks 320, 330 each function as an SD (instead of a JD) over $Q^{[1]}$ with $q^{[1]}$=9. In the second stage 350, the SLI block 352 functions as a JD over QPSK with $q^{[2]}$=4. As such, each SD included in the first stage 310 pre-filters both signal streams down to one stream and jointly demodulates the single stream over a centroid-based constellation of size 9. In the second stage 350, the modified streams output by both SDs form a modified signal vector which is processed jointly by a JD, over a reduced alphabet of size 16, for a total of 34 metrics.

For 2×2 MIMO with 64-QAM, the SL34 MSA-SLI design can be used. In another embodiment, four SDs are used in the first stage and two JDs are used in the second (final) stage. This is similar to the 2×2 MIMO receiver previously described herein, with whitening added in the second stage. In yet another embodiment, 4 SDs are used in the first stage and a single JD is used in the second (final) stage. The JD of the final stage jointly processes all four modified signals output by the SDs of the first stage according to this embodiment. However, complexity grows accordingly. In still another embodiment, two JDs are used in the first stage. Each JD jointly processes two of the signal components, treating the other two signal components as noise as previously described herein. A single JD is included in the second (final) stage for jointly processing the outputs of both JDs of the first stage. This embodiment adds to the complexity, but is effective.

Figure 8:
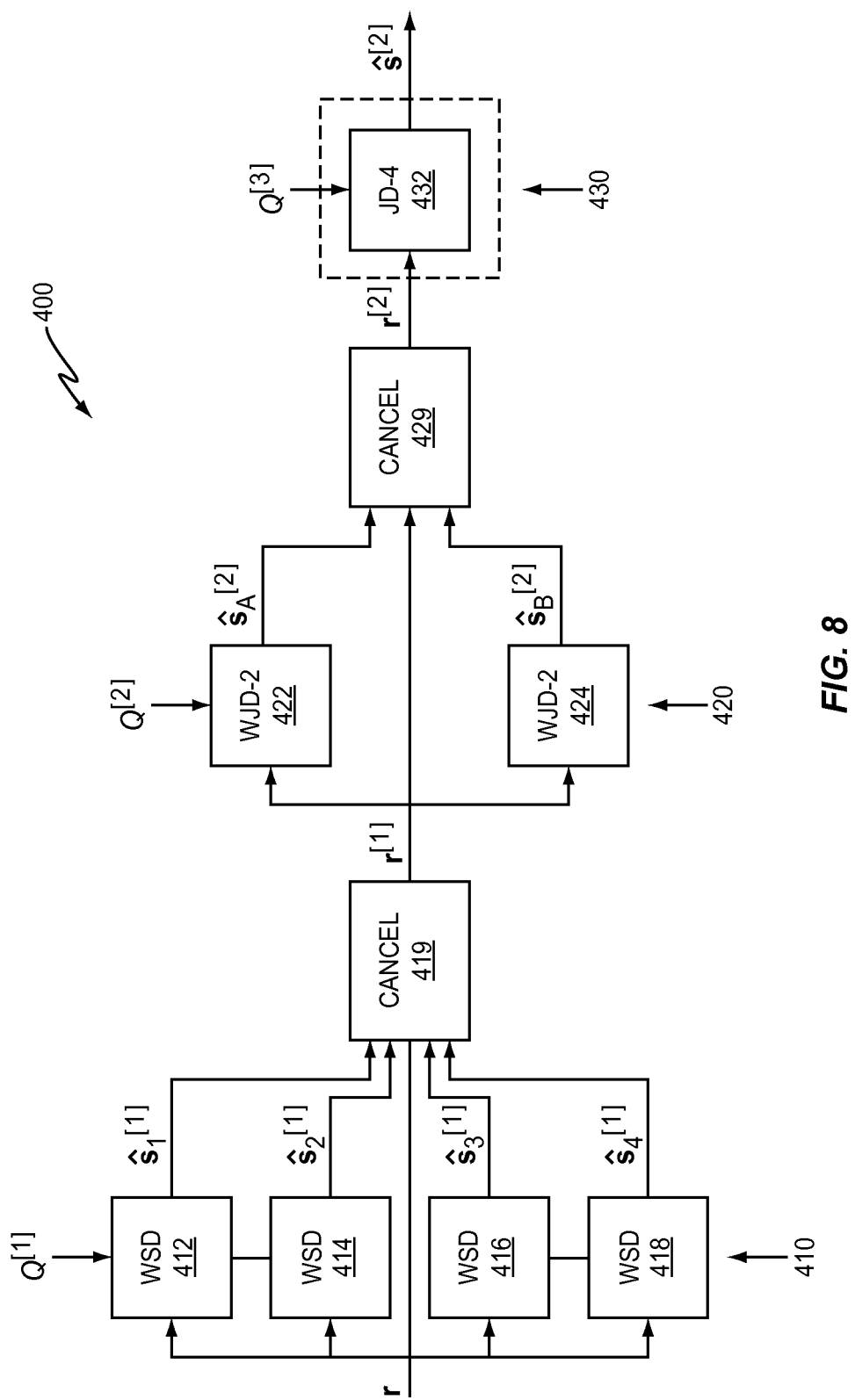
FIG. 8 illustrates a block diagram of an embodiment of 3-stage MSA-SLI receiver structure.

FIG. 8 illustrates an embodiment of a 3-stage MSA SLI receiver structure 400 for use in a 4×4 MIMO, 64-QAM environment. The first stage 410 includes four WSDs 412-418, the second stage 420 two WJDs 422, 424 and the third stage 430 a single JD 432. Each of the WSDs 412-418 of the first stage 410 processes the entire received signal vector r using the centroid-based constellation $Q^{[1]}$ provided by the constellation processing module 140 for the first stage 410, treating the remaining signals as interference which is suppressed as previously described herein. A cancellation block 419 included in or associated with the first stage 410 modifies the original signal vector r to produce a modified signal vector $r^{[1]}$ given by:

$$r^{[1]} = r - H \begin{bmatrix} \hat{s}_1^{[1]} \\ \hat{s}_2^{[1]} \\ \hat{s}_3^{[1]} \\ \hat{s}_4^{[1]} \end{bmatrix} \quad (19)$$

The first JD 422 of the second stage 420 processes the modified signal vector $r^{[1]}$ output by the first cancellation block 419 to detect the symbols from stream set A, using the centroid-based constellation $Q^{[2]}$ provided by the constellation processing module 140 for the second stage 420, treating the signal contribution from the streams in set B in modified signal vector $r^{[1]}$ as interference which is suppressed. The other JD 424 included in the second stage 410 similarly processes the modified signal vector $r^{[1]}$ to detect the symbols from stream set B, using the centroid-based constellation $Q'^{[2]}$, treating the signal contribution from the streams in set A in modified signal vector $r^{[1]}$ as interference which is suppressed. A cancellation block 429 included in or associated with the second stage 420 modifies signal vector $r^{[1]}$ to produce a newly modified signal vector $r^{[2]}$ given by:

$$r^{[2]} = r^{[1]} - H \begin{bmatrix} \hat{s}_A^{[1]} \\ \hat{s}_B^{[1]} \end{bmatrix} \quad (20)$$

The JD 432 of the third stage 430 processes the modified signal vector $r^{[2]}$ output by the second cancellation block 429 using a subset $Q^{[3]}$ of the QAM constellation associated with the transmitted signals.

The third stage 430 uses a JD over all 4 streams. There is no residual signal left in the third stage 430. As a result, none of the signal components are treated as colored noise in the third (final) stage 430, and thus pre-filtering is not employed. Pre-filtering may be employed in the non-final stages 410, 420 as previously described herein. In another embodiment, the SL34 design is used in the 4×4 MIMO, 64-QAM environment. In yet another embodiment, the receiver includes four SDs in the first stage, two JDs in the second stage, and two JDs in the third stage, acting on different signal pairs. Specifically, signals {1,2} and {3,4} are processed together in the second stage, and signals {1,4} and {2,3} are processed together in the third stage. Other signal pairings can be used. In each of these embodiments, all of the reconstructed signals are removed at a given stage, e.g. as given by equation (17). In an alternative subtraction technique, the signals are subtracted differently for different SLI blocks at a given stage. This alternative approach further limits the propagation of errors.

Figure 9:
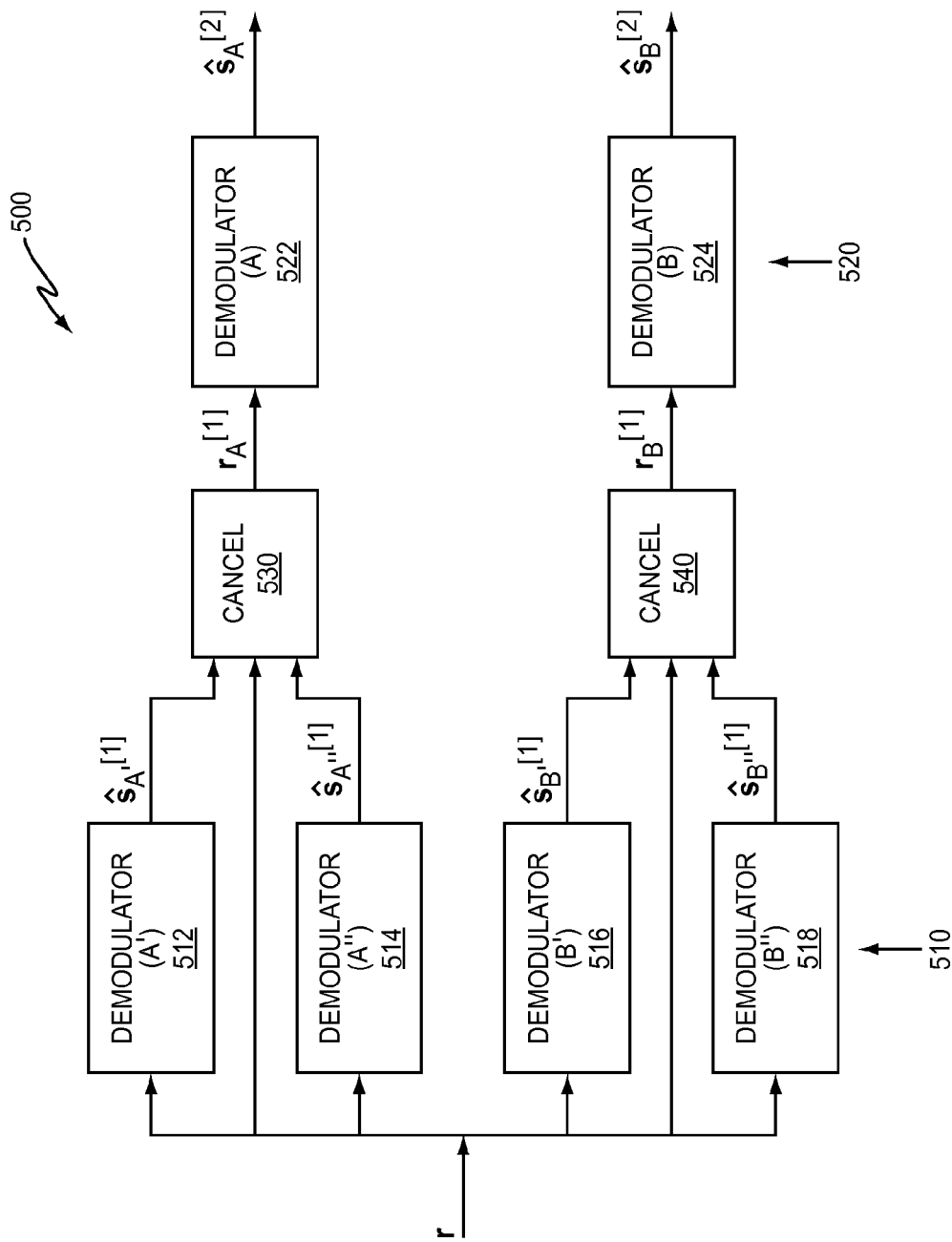
FIG. 9 illustrates a block diagram of another embodiment of 2-stage MSA-SLI receiver structure.

FIG. 9 illustrates an embodiment of an MSA-SLI receiver structure 500 which employs an alternative subtraction approach. The first stage 510 includes four demodulators 512-518 and the second stage 520 includes two demodulators 522, 524. In the first stage 510, the signals are partitioned into sets A', A", B' and B". In the second stage 520, the signals in A' and A" are processed together as set A in the first SLI demodulator block 522. Similarly, the signals in B' and B" are processed together as set B in the other SLI demodulator block 524 of the second stage 520. With the previous MSA-SLI techniques described herein, the same modified signal $r^{[1]}$ would be fed to both SLI blocks 522, 524 of the second stage 520. However, in this embodiment, a modified signal $r_A^{[1]}$ given by:

$$r_A^{[1]} = r - H_A \hat{s}_A^{[1]} \quad (21)$$

is provided as input to the first demodulator 522 of the second stage 520. A signal canceler 530 generates the modified signal $r^{[1]}$ which is based on $\hat{s}_A^{[1]}$, and $\hat{s}_{A''}^{[1]}$ is subtracted from r. Thus, signal $r_A^{[1]}$ is modified based on the reconstructed signals from sets A' and A" only. As such, the demodulator 522 which receives $r_A^{[1]}$ as input does not see the reduction in interference due to third and fourth demodulators 516, 518 of the first stage 510 which process signals B' and B", respectively. Accordingly, the first demodulator 522 of the second stage 520 uses the true symbol energy $E_B$, instead of the residual symbol energy $E_B^{res}$.

A second modified signal $r_B^{[1]}$ similarly given by:

$$r_B^{[1]} = r - H_B \hat{s}_B^{[1]} \quad (22)$$

is input to the second demodulator 524 of the second stage 520. Signal $r_B^{[1]}$ is modified by a second signal canceler 540 based on the reconstructed signals from sets B' and B" only. Again, the second demodulator 524 of the second stage 520 does not benefit from the reduction in interference due to the first and second demodulators 512, 514 of the first stage 510 which process signals A' and A", respectively. Thus, the second demodulator 524 of the second stage 520 also adjusts its version of the symbol energy accordingly. Both demodulators 522, 524 of the second stage 520 may implement pre-filtering as previously described herein to further improve receiver performance.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of jointly demodulating and suppressing interference from a plurality of transmitted signals transmitted using a multi-antenna and/or multi-code transmission scheme, comprising:
    deriving a set of centroid-based values from subsets of constellation points associated with the transmitted signals for input to each non-final stage of a multi-stage demodulator;
    demodulating a group of signals input to each of the non-final stages using the corresponding set of centroid-based values as constellation points;
    suppressing residual interference associated with using the set of centroid-based values as constellation points for demodulating the group of signals input to each of the non-final stages;
    modeling the residual interference associated with the set of centroid-based values as colored noise;
    accounting for the colored noise in an overall noise model including other stream interference and additive noise;
    pre-filtering the group of signals based on the overall noise model to suppress overall colored noise at each non-final stage of the multi-stage demodulator; and
    demodulating a group of modified signals input to a final stage of the multi-stage demodulator using the subset of constellation points input to the final stage to determine a final symbol decision for the plurality of transmitted signals.

2. The method of claim 1, comprising determining the set of centroid-based values input to each non-final stage of the multi-stage demodulator by:
    grouping the constellation points associated with the transmitted signals into the subsets of constellation points, at least two adjacent ones of the subsets having one or more common constellation points so that the at least two adjacent subsets overlap;
    determining a centroid-based value for each of the subsets of constellation points; and
    selecting a plurality of the centroid-based values for inclusion in the set.

3. The method of claim 1, wherein determining a centroid-based value for each of the subsets of constellation points comprises determining a centroid for each of the subsets of constellation points.

4. The method of claim 1, wherein the set of centroid-based values has a plurality of QAM centroid-based values derived based on an ASK modulations scheme.

5. The method of claim 1, wherein the subset of constellation points input to the final stage of the multi-stage demodulator has a centroid-based value corresponding to a localized symbol decision determined by one or more preceding stages of the multi-stage demodulator.

6. The method of claim 1, comprising:
    determining a plurality of localized symbol decisions by each non-final stage of the multi-stage demodulator corresponding to respective ones of the centroid-based values included in the set of centroid-based values input to the non-final stage; and
    determining a localized symbol decision by the final stage of the multi-stage demodulator corresponding to one of the constellation points included in the subset of constellation points input to the final stage.

7. The method of claim 6, comprising combining the localized symbol decisions determined by the non-final and final stages of the multi-stage demodulator to determine the final symbol decision.

8. A receiver, comprising:

A multi-stage demodulator having a plurality of non-final demodulation stages and a final demodulation stage;

a constellation processing module operable to derive a set of centroid-based values from subsets of constellation points associated with a plurality of transmitted signals for input to each of the non-final demodulation stages;

wherein each of the non-final demodulation stages is operable to demodulate a group of signals input to the non-final demodulation stage using the set of centroid-based values as constellation points and suppress residual interference associated with using the set of centroid-based values as constellation points for signal demodulation and wherein the multi-stage demodulator is operable to model the residual interference associated with the set of centroid-based values as colored noise, account for the colored noise in an overall noise model including other stream interference and additive noise and pre-filter the group of signals based on the overall noise model to suppress overall colored noise at each non-final stage of the multi-stage demodulator; and wherein the final demodulation stage is operable to demodulate a group of modified signals input to the final demodulation stage using the subset of constellation points input to the final demodulation stage to determine a final symbol decision for the plurality of transmitted signals.

9. The receiver of claim 8, wherein the constellation processing module is operable to group the constellation points associated with the transmitted signals into the subsets of constellation points, at least two adjacent ones of the subsets having one or more common constellation points so that the at least two adjacent subsets overlap, determine a centroid-based value for each of the subsets of constellation points, and select a plurality of the centroid-based values for inclusion in the set.

10. The receiver of claim 8, wherein the set of centroid-based values has a plurality of QAM centroid-based values derived based on an ASK modulations scheme.

11. The receiver of claim 8, wherein the subset of constellation points input to the final demodulation stage has a centroid-based value corresponding to a localized symbol decision determined by one or more of the non-final demodulation stages.

12. The receiver of claim 8, wherein each non-final demodulation stage is operable to determine a plurality of localized symbol decisions corresponding to respective ones of the centroid-based values included in the set of centroid-based values input to the non-final demodulation stage; and wherein the final demodulation stage is operable to determine a localized symbol decision corresponding to one of the constellation points included in the subset of constellation points input to the final demodulation stage.

13. The receiver of claim 8, wherein the multi-stage demodulator is operable to combine the localized symbol decisions determined by the non-final and final demodulation stages to determine the final symbol decision.

14. The receiver of claim 8, wherein the final demodulation stage comprises a joint maximum likelihood detector.

15. The receiver of claim 8, wherein one or more of the non-final demodulation stages comprises a joint maximum likelihood detector.

\* \* \* \* \*

UNITED STATES PATENT AND TRADEMARK OFFICE
CERTIFICATE OF CORRECTION

PATENT NO. : 8,514,924 B2
APPLICATION NO. : 13/714925
DATED : August 20, 2013
INVENTOR(S) : Khayrallah It is certified that error appears in the above-identified patent and that said Letters Patent is hereby corrected as shown below:

In the Specification

In Column 6, Line 35, in Equation (15), delete "$R_A^{res} = H_A H_A^H E_A^{res}$" and insert -- $R_A^{res} = H_A H_A^H E_A^{res}$ --, therefor.

In Column 8, Line 50, delete "second stage 410" and insert -- second stage 420 --, therefor.

In Column 9, Line 38, delete "$r^{[1]}$" and insert -- $r_A^{[1]}$ --, therefor.

In the Claims

In Column 11, Line 2, in Claim 8, delete "A multi-stage" and insert -- a multi-stage --, therefor.

Signed and Sealed this
Seventeenth Day of December, 2013

Margaret A. Focarino
*Commissioner for Patents of the United States Patent and Trademark Office*